B. BALG.
APPARATUS FOR MAKING HOLLOW ARTICLES FROM PLASTIC MATERIAL.
APPLICATION FILED AUG. 17, 1909.
1,071,600.
Patented Aug. 26, 1913.
2 SHEETS—SHEET 1.
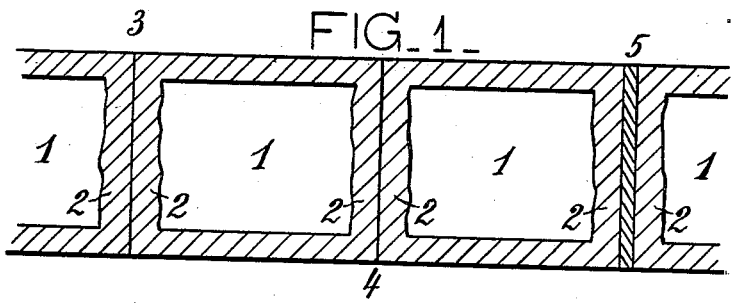
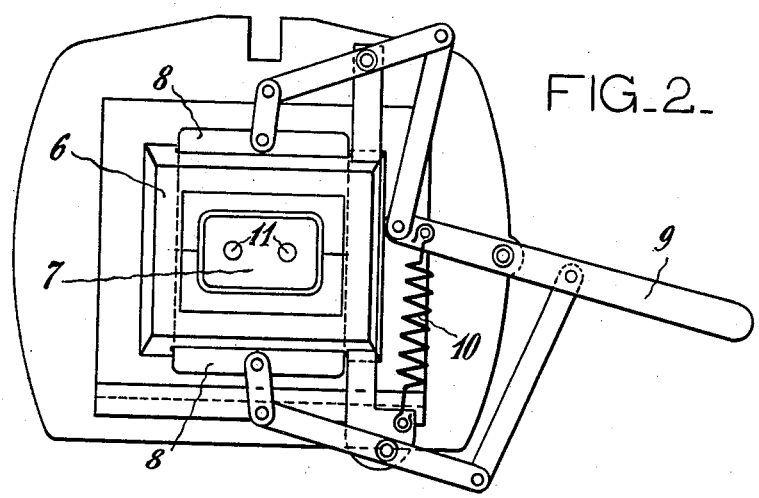
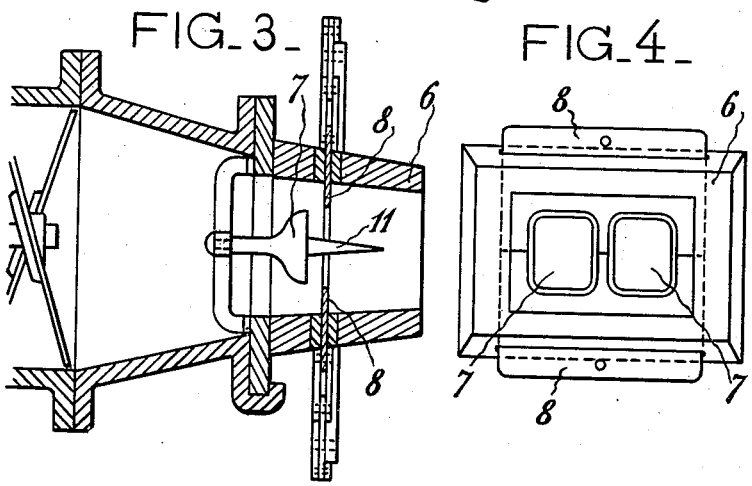
WITNESSES:
INVENTOR,
BERNHARD BALG.
by
Attorney.

B. BALG.
APPARATUS FOR MAKING HOLLOW ARTICLES FROM PLASTIC MATERIAL.
APPLICATION FILED AUG. 17, 1909.
1,071,600.
Patented Aug. 26, 1913.
2 SHEETS—SHEET 2.
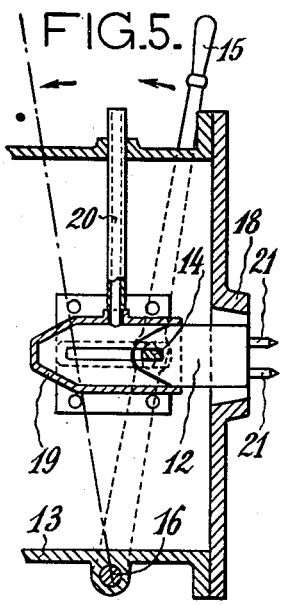
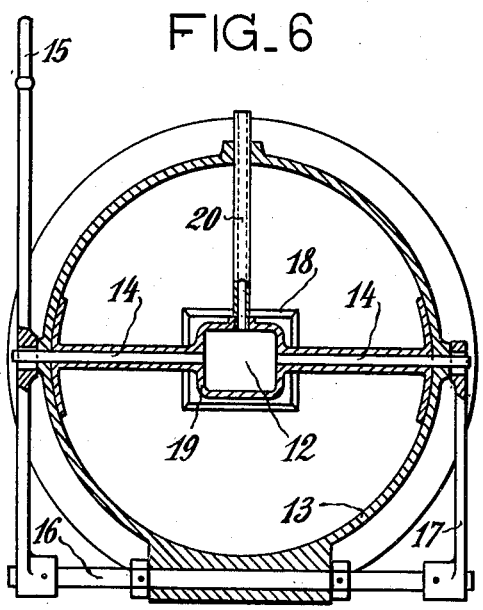
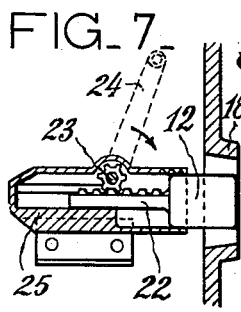
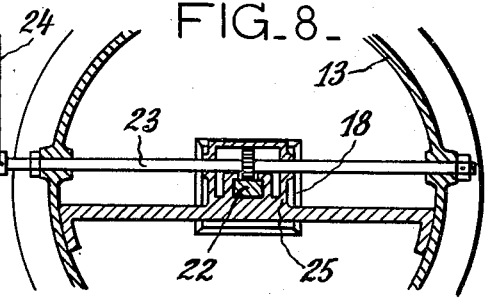
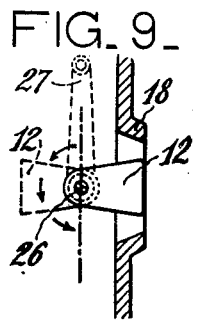
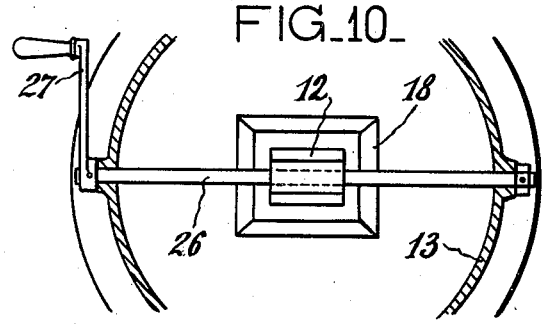
WITNESSES:
INVENTOR,
BERNHARD BALG,
by
Attorney.

UNITED STATES PATENT OFFICE.

BERNHARD BALG, OF GÖRLITZ, GERMANY.

APPARATUS FOR MAKING HOLLOW ARTICLES FROM PLASTIC MATERIAL.

1,071,600.  Specification of Letters Patent.  Patented Aug. 26, 1913.

Application filed August 17, 1909. Serial No. 513,281.

*To all whom it may concern:*

Be it known that I, BERNHARD BALG, manufacturer, a subject of the King of Prussia, residing at 20 Postplatz, in the city of Görlitz, Silesia, in the Kingdom of Prussia and Empire of Germany, have invented new and useful Improvements in Apparatus for Making Hollow Articles from Plastic Material, of which the following is a specification.

For a long time attempts have been made to produce by machinery, in a simple manner, hollow articles, such as building blocks closed on all sides. This problem has now been solved according to the present invention, by causing a stream of plastic material to issue from a press in a stream composed of a connected series of alternately succeeding internally hollow and solid portions, so that it is merely necessary to divide the said stream transversely, in order to produce a hollow building block or other hollow article in one operation.

The formation of the series of alternately succeeding solid and hollow portions may be effected in various ways. For instance, slides or the like may be introduced at determined intervals into the hollow stream formed in the press so as to arrest its progress, whereby the material is caused to form each time a solid portion at that place. Or the cores employed for making the hollow portions may be made movable in such a manner that they can be removed temporarily from their position, whereby the plastic material is caused to form a solid stream at that place.

In the accompanying drawings:—Figure 1 is a diagrammatic longitudinal section of the stream of plastic material as it issues from the press. Fig. 2 is a front elevation, and Fig. 3 is a vertical longitudinal section of the mouthpiece of a brickmaking press. Fig. 4 is a front elevation of a mouthpiece with two cores, the fixing plate being omitted. Fig. 5 is a vertical longitudinal section, and Fig. 6 is a vertical cross section through the mouthpiece of a press having a movable core. Figs. 7 and 8 are, respectively, a vertical longitudinal section and a vertical cross section of a second modification; and Figs. 9 and 10 are corresponding views of a third modification.

Referring, first, to Figs. 2 to 4, one or more cores, 7, according to the desired number of internal cavities which the blocks are to have in the transverse direction are arranged in the mouthpiece 6 of the press. These cores, which may have any desired shape and cross section, are preferably fixed in the mouthpiece; but they may be movable, if so desired, and as shown in Figs. 5–10. Two slides, 8, (Figs. 2–4), are arranged in the mouthpiece a short distance in front, or advance, of the core or cores, 7, in such a manner as to be capable of being moved relatively to each other so that they can be moved into or out of the mouthpiece. These movements may be effected by means of a hand lever, 9, through the medium of suitable lever mechanism. A spring, 10, acting upon the lever 9, has a tendency to maintain the slides normally out of the mouthpiece. The slides may be formed, according to the number of cores employed, with one or more cut-away portions or openings which are slightly larger than the cores and of a form similar to the cross-section of the cores. The mouthpiece is continued outward beyond the slides, so as to form a guide for the stream of plastic material as it issues from the press. The core, or cores, may be provided with conically pointed pins, 11, of any desired cross section for the purpose of piercing airholes in the webs or solid portions of the blocks. When the slides 8 are removed from the mouthpiece a hollow stream of plastic material issues, in the usual manner, from the press. The slides are then moved into contact with each other, at determined intervals of time. By this means, the progress of the stream of material is arrested, so that the material accumulates at or behind the slides, while a portion of the material may enter through the opening, still left between the slides, into the hollow stream situated in front of the slides, and thus go to form also a solid portion, or web, at the end of the said hollow stream. As shown, a hollow portion, 1, alternates with a solid portion, 2, throughout the length of the stream. When the slides are removed, the stream issues in its hollow form, as before. Any other movable parts may be employed instead of the slides.

The stream is separated, transversely, in the usual manner, into its several portions by means of any usual cutting devices, through the solid portions, 3 and 4, (Fig. 1) into the desired blocks, which are formed closed on all sides, without any further operations. The cutting devices may be connected to the lever 9 in such a manner that when they are operated they also cause the said lever to operate. The stream may be divided at any points. Thus, as shown in Fig. 1, the cuts may be made (at 3, 4) through the webs, 2, to produce hollow building or other blocks closed on all sides; and, when it is desired that the blocks shall have very thin end walls, the separation of the stream may be effected by means of two wires stretched apart side by side as indicated at 5. The cuts may be made instead or also at the thinner parts of the stream, to produce pots or other hollow articles. It will also be understood, that the cuts may be made at such points that the product will have a succession of hollow spaces and webs.

It is an essential feature of my apparatus that it shall have means whereby the outlet area of the exit mouthpiece may be varied, at desired intervals of time, in order that the plastic material (which normally issues in tubular form from the mouthpiece) may be held back, diverted, or otherwise manipulated, to the end that, at said intervals, the plastic material shall come together to form solid portions, such as webs in or ends of hollow blocks or other hollow articles. In Figs. 2 and 3, I have shown the effecting of this result by means of a stationary core (or cores) and relatively-movable slides, 8, having cut-away portions. However, the desired result may be assured, if the apparatus is without these slides, and has a core (or cores) movable into, or advanced toward, the exit mouthpiece, to give tubular form to the issuing stream of plastic material, and removable from such position to permit the plastic material, as it issues, to come together. This removal of the cores may be effected in various ways, three arrangements for the purpose being illustrated in Figs. 5 to 10.

In the construction shown in Figs. 5 and 6, the core, 12, is carried by a rod, 14, extending transversely through the press head 13. On one end of this rod, externally of the press head, there is mounted (with some play) the hand lever, 15, which is fixed on a shaft, 16, that is mounted below the press head and is capable of rocking in its bearing. On the opposite end of the shaft 16, there is fixed a second lever, 17, which is also arranged to act upon the rod 14 with a slight amount of play. On moving the hand lever 15, the rod 14 is consequently moved, together with the core 12, uniformly in either direction. The core 12 projects into the mouthpiece, 18, of the press and is guided with a tight joint in a closed casing, 19, which is formed in each side with a slot for the passage of the rod 14. The rod 14 is likewise guided either in lateral extensions of the casing 19, or in a separate casing (Fig. 6). The casing 19 is fitted with a pipe, 20, which serves for conveying water or oil and for the escape or the admission of air. The core 12 is (see Fig. 5) provided, in front, with one or more pins, 21, which are pointed conically at their ends and serve to form air holes in the webs or solid portions of building blocks or other articles. These pins may have any desired cross section.

In the construction shown in Figs. 7 and 8, the core 12 is provided with a rack, 22, with which engages a pinion mounted on a shaft, 23. On the outer end of this shaft 23, is a crank 24 by means of which the core can be moved back and forth. The rack and the pinion are inclosed in a casing, 25, in which the core 12 is guided with a tight joint.

In the construction shown in Figs. 9 and 10, the core 12 is mounted so as to be capable of rotating with an axle, 26, on the end of which, situated outside the press-head, is a crank handle, 27. By turning this crank handle, in the direction of the arrows shown in Fig. 9, the core can be turned back into the position shown in dotted lines (to permit the stream to unite) and also forward again into the working position, or that shown in full lines, to compel the plastic material to issue in tubular form from the mouthpiece 18.

In the constructions shown in Figs. 5 to 10, the forming of the solid portions in the stream of plastic material issuing from the press is effected by removing the core or cores temporarily from the mouthpiece. When the cores are moved back—drawn from the mouthpiece—the great pressure exerted by the press produces a solid portion in the issuing stream. After the cores have been moved forward again, the plastic material continues to issue as a hollow stream. Pins (such as 21) are so mounted, in any suitable manner, as to be capable of movement in the mouthpiece. When the cores are provided with these pins 21, the latter pierce the previously-formed solid portion of the stream from behind and thus, as before outlined, form air holes in the abutting ends of the two adjacent hollow blocks that are subsequently separated from each other.

The improved apparatus is applicable to the production of all kinds of building or other blocks closed on all sides, or other hollow articles, from any plastic material and the said blocks may be formed with one or more internal cavities by employing the corresponding number of cores.

The process which is herein mentioned, constitutes the subject matter of a divisional application, Serial No. 567,629, filed June 18, 1910.

What I claim is:

1. In an apparatus for producing hollow articles, the combination of a press having a mouthpiece adapted to produce a tubular stream of plastic material and means adapted at intervals to direct into said tubular stream a filling for forming a web.

2. In an apparatus for producing hollow articles from plastic material, a press having an exit mouthpiece, a core located within the mouthpiece for causing a stream of plastic material to issue from the latter in tubular form, and a movable device disposed in the mouthpiece in advance of said core and arranged for operation at desired intervals of time for filling said tubular stream, between said core and said movable device with material, to provide a web in said stream within the mouthpiece.

3. In an apparatus for producing hollow articles from plastic material, a press having an exit mouthpiece, a core located within the mouthpiece for causing a stream of plastic material to issue from the latter in tubular form and slides provided with cutting out, said slides being disposed in the mouthpiece and arranged for operation at desired intervals of time for filling said tubular stream between said core and said slides with material, to provide a web in said stream within the mouthpiece.

4. In an apparatus for producing hollow articles, a press having a mouthpiece adapted to produce a tubular stream of plastic material, means adapted at intervals to direct into said tubular stream a filling for forming a web and means for forming an opening in the web aforesaid.

5. In an apparatus for producing hollow articles from plastic material, a press having an exit mouthpiece, a core located in line with the mouthpiece for causing a stream of plastic to issue from the latter in tubular form, a movable device, disposed in advance of said core and arranged for operation at desired intervals of time for constricting said stream, to provide webs within the same, and a pin arranged on the core for forming an opening in the web aforesaid.

6. In an apparatus for producing hollow articles from plastic material, a press having an exit mouthpiece, a core located within the mouthpiece for causing a stream of plastic material to issue from the latter in tubular form and slides provided with cutting outs said slides being disposed in the mouthpiece and arranged for operation at desired intervals of time for filling said tubular stream between said core and said slides with material, to provide a web in said stream within the mouthpiece and a pin arranged on the core for forming an opening in the web aforesaid.

In testimony whereof I have signed my name to this specification in the presence of two subscribing witnesses.

BERNHARD BALG.

Witnesses:
 HENRY HASPER,
 WOLDEMAR HAUPT.

---

Copies of this patent may be obtained for five cents each, by addressing the "Commissioner of Patents, Washington, D. C."